United States Patent
Bhandaru et al.

(10) Patent No.: US 10,645,577 B2
(45) Date of Patent: May 5, 2020

(54) ENHANCED SECURE PROVISIONING FOR HOTSPOTS

(71) Applicant: Avago Technologies General IP (Singapore) Pte. Ltd., Singapore (SG)

(72) Inventors: Nehru Bhandaru, San Jose, CA (US); Thomas Derham, La Jolla, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 298 days.

(21) Appl. No.: 15/650,778

(22) Filed: Jul. 14, 2017

(65) Prior Publication Data
US 2018/0020353 A1    Jan. 18, 2018

Related U.S. Application Data

(60) Provisional application No. 62/363,111, filed on Jul. 15, 2016, provisional application No. 62/471,304, filed on Mar. 14, 2017.

(51) Int. Cl.
*H04W 12/06* (2009.01)
*H04W 12/08* (2009.01)
(Continued)

(52) U.S. Cl.
CPC .............. *H04W 12/06* (2013.01); *G09C 5/00* (2013.01); *H04L 9/088* (2013.01); *H04L 9/0844* (2013.01);
(Continued)

(58) Field of Classification Search
CPC ..... H04W 12/06; H04W 12/04; H04W 12/08; H04W 48/08; G09C 5/00; H04L 9/0844; H04L 9/088; H04L 63/061; H04L 63/0807; H04L 63/0876; H04L 63/10; H04L 2209/30; H04L 2209/80
(Continued)

(56) References Cited

U.S. PATENT DOCUMENTS 6,894,994 B1* 5/2005 Grob .................... H04B 1/7103
                                                         370/335
8,271,786 B1* 9/2012 Pradhan ................ G06F 21/445
                                                         713/169
(Continued)

*Primary Examiner* — Shahriar Zarrineh
(74) *Attorney, Agent, or Firm* — Morgan, Lewis & Bockius LLP

(57) ABSTRACT

A ticket-based shared secret authentication is provided. A client device receives a ticket, and performs an authentication with an access point using the ticket. The access point deploys a first public key-private key pair to an intermediate device. The intermediate device and access point share a master secret to protect information in the ticket. The access point receives an association request from the client device that includes a nonce public key and a signature using a second public key-private key pair provided by the intermediate device. The access point authenticates the client device using the nonce public key. The access point sends an association response to the client device based on the authentication and a signature using the first public key-private key pair. The access point initiates an association with the client device to permit the client device to connect to a network associated with the access point.

21 Claims, 8 Drawing Sheets

(51) Int. Cl.
*H04W 12/04* (2009.01)
*H04L 29/06* (2006.01)
*H04W 48/08* (2009.01)
*H04L 9/08* (2006.01)
*G09C 5/00* (2006.01)

(52) U.S. Cl.
CPC ........ *H04L 63/061* (2013.01); *H04L 63/0807* (2013.01); *H04L 63/0876* (2013.01); *H04L 63/10* (2013.01); *H04W 12/04* (2013.01); *H04W 12/08* (2013.01); *H04W 48/08* (2013.01); *H04L 2209/30* (2013.01); *H04L 2209/80* (2013.01)

(58) Field of Classification Search
USPC ........................................................ 713/153
See application file for complete search history.

(56) References Cited

U.S. PATENT DOCUMENTS

| | | | | | |
|---|---|---|---|---|---|
| 8,613,052 | B2* | 12/2013 | Weiss | .................. | H04L 63/0846 726/4 |
| 10,169,587 | B1* | 1/2019 | Nix | .......................... | G06F 21/57 |
| 2002/0054334 | A1* | 5/2002 | Harrison | ............... | H04N 1/4413 358/1.15 |
| 2003/0051140 | A1* | 3/2003 | Buddhikot | ............ | H04L 63/062 713/169 |
| 2004/0165728 | A1* | 8/2004 | Crane | ..................... | G06F 21/62 380/279 |
| 2006/0053289 | A1* | 3/2006 | Singh | .................... | H04L 9/3273 713/169 |
| 2008/0301776 | A1* | 12/2008 | Weatherford | ........... | G06F 21/31 726/3 |
| 2008/0319904 | A1* | 12/2008 | Carlson | .................. | G06Q 40/00 705/44 |
| 2009/0125996 | A1* | 5/2009 | Guccione | ........... | H04L 63/0853 726/6 |
| 2010/0031036 | A1* | 2/2010 | Chauncey | ........... | H04L 63/0428 713/168 |
| 2010/0263032 | A1* | 10/2010 | Bhuyan | ................. | H04L 63/061 726/7 |
| 2010/0299525 | A1* | 11/2010 | Shah | ................... | H04L 63/0428 713/171 |
| 2011/0213953 | A1* | 9/2011 | Challener | ................ | G06F 21/57 713/2 |
| 2012/0124369 | A1* | 5/2012 | Amenedo | ............. | H04L 63/062 713/156 |
| 2012/0191522 | A1* | 7/2012 | McLaughlin | .......... | G06Q 50/01 705/14.23 |
| 2013/0042313 | A1* | 2/2013 | Lambert | ................ | H04W 12/04 726/7 |
| 2013/0151358 | A1* | 6/2013 | Ramalingam | ............ | G07G 1/12 705/16 |
| 2013/0151419 | A1* | 6/2013 | Hitchcock | .............. | G06Q 30/06 705/75 |
| 2013/0198519 | A1* | 8/2013 | Marien | .................... | G06F 21/34 713/172 |
| 2013/0212637 | A1* | 8/2013 | Guccione | .............. | H04L 63/102 726/1 |
| 2013/0243194 | A1* | 9/2013 | Hawkes | ................. | H04L 63/067 380/270 |
| 2013/0247150 | A1* | 9/2013 | Cherian | .............. | H04L 63/0815 726/4 |
| 2014/0122242 | A1* | 5/2014 | Stephenson | ............. | H04W 4/21 705/14.64 |
| 2015/0113277 | A1* | 4/2015 | Harkins | .................. | H04L 9/083 713/171 |
| 2015/0134441 | A1* | 5/2015 | Balar | ..................... | G06Q 20/20 705/14.38 |
| 2015/0229475 | A1* | 8/2015 | Benoit | ...................... | H04L 9/14 713/168 |
| 2015/0237519 | A1* | 8/2015 | Ghai | ............... | H04W 12/04031 380/270 |
| 2016/0029215 | A1* | 1/2016 | Jung | ..................... | H04W 12/06 713/168 |
| 2016/0055485 | A1* | 2/2016 | Benoit | ................. | G06Q 20/401 705/71 |
| 2016/0057237 | A1* | 2/2016 | Yang | ........................ | H04L 67/16 709/224 |
| 2016/0065370 | A1* | 3/2016 | Le Saint | ............... | H04L 9/0891 713/155 |
| 2016/0071081 | A1* | 3/2016 | Zheng | .................. | H04L 63/083 705/71 |
| 2016/0094991 | A1* | 3/2016 | Powell | .................... | G06Q 20/32 455/411 |
| 2016/0149880 | A1* | 5/2016 | Paczkowski | ............ | H04L 45/50 726/4 |
| 2016/0277370 | A1* | 9/2016 | Lee | .................... | H04W 12/0023 |
| 2016/0353357 | A1* | 12/2016 | Asterjadhi | ............ | H04L 5/0055 |
| 2017/0288867 | A1* | 10/2017 | Collier | .................. | H04L 9/0861 |
| 2018/0020353 | A1* | 1/2018 | Bhandaru | ............ | H04L 63/061 |

\* cited by examiner

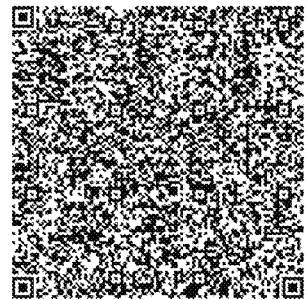

WIFI:T:UNAUTH;T:LS:S:CafeEspresso;C:MIICQDCCAae
agAwiBAg;IJAMKXeKyMO1PkMAoGCCqGSM49BAMC
MGExCzAJBgNVBAYTAIVTMRMwEQYDVQQIDApDY
WxpZm9ybmlhMRMwEQYDVQQHDApDYWxpZm9yb
mlhMREwDwYGVQQKDAhCcm9hZGNvbTEVMBMGA
1UEAwwMMTlxyLjE2OC4xLjE6MB4XDTE2MDYyODly
NTQ0NloXDTM2MDYyMzlyNTQ0NlowYTELMAkGA1
UEBhMCVVMxEzARBgNVBAgMCkNhbGlmb3JuaWE
xEzARBgNVBAcMCkNhbGlmb3JuaWExEzXETAPBgNVB
AoMCEJyb2FkY29tMRUwEwYDVQQDDAwxcOTluMTY
4LjEuMTowWTATBgcqhkjOPQIBBggqhkjOPCQMB8wN
CAASQQnipGfmumec353gykDmLho4beff2gNGvsvAi
MC2sj2q7PAoTjYTu5xEILXVorumba/7x8L5dtW13kBFh
y3sCj8Yz6jIRYyxqDAfBgNVHSMEGDAWg8SZhyNVH
s7u16y3s8QBYzR6JRYyxDAPBgNVHRMBAf8EBTADA
QH/MA4GA1UdDwEB/wQEAwiBhjAgBgNVHREEGTA
XghVzZWN1cmVhcC51cGwY5j2cDbw2UqoVy3Q
zjDEAwiDSAAwRQIhAJ21Fubx+i5Vp5Dbw2UqoV3G
gCu2aVCrNDvSFzHlCizpxRmitA=;

FIG. 5A

WIFI:T:UNAUTH;T:LS:S:CafeEspresso;K:MDkwEwYHK
oZIzj0CAQYIKoZIzj0DAQcDIgAC/K/J5aRn5rpmnN+d4
MpA5Ita-OG3nf4/9oDRr7Lwij4mbl=;;

FIG. 5B

ENHANCED SECURE PROVISIONING FOR HOTSPOTS

CROSS-REFERENCE TO RELATED APPLICATIONS

The present application claims the benefit of priority under 35 U.S.C. § 119 from U.S. Provisional Patent Application Ser. No. 62/363,111 entitled "SECURE PROVISIONING METHOD FOR HOTSPOTS," filed on Jul. 15, 2016, and U.S. Provisional Patent Application Ser. No. 62/471,304 entitled "ENHANCED SECURE PROVISIONING METHOD FOR HOTSPOTS," filed on Mar. 14, 2017, the disclosures of which are hereby incorporated by reference in their entirety for all purposes.

TECHNICAL FIELD

The present disclosure relates to wireless communication systems, and more particularly to enhanced secure provisioning for hotspots.

BACKGROUND

In a public WiFi environment, particularly with a consumer-grade (e.g. non-enterprise) access point (AP), implementing security features may be difficult, or may require an increased burden on users.

BRIEF DESCRIPTION OF THE DRAWINGS

Certain features of the subject technology are set forth in the appended claims. However, for purpose of explanation, one or more implementations of the subject technology are set forth in the following figures.

FIGS. 5A and 5B illustrate examples of secure provisioning using anonymous authentication in accordance with one or more implementations.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, structures and components are shown in block diagram form in order to avoid obscuring the concepts of the subject technology.

Figure 1:
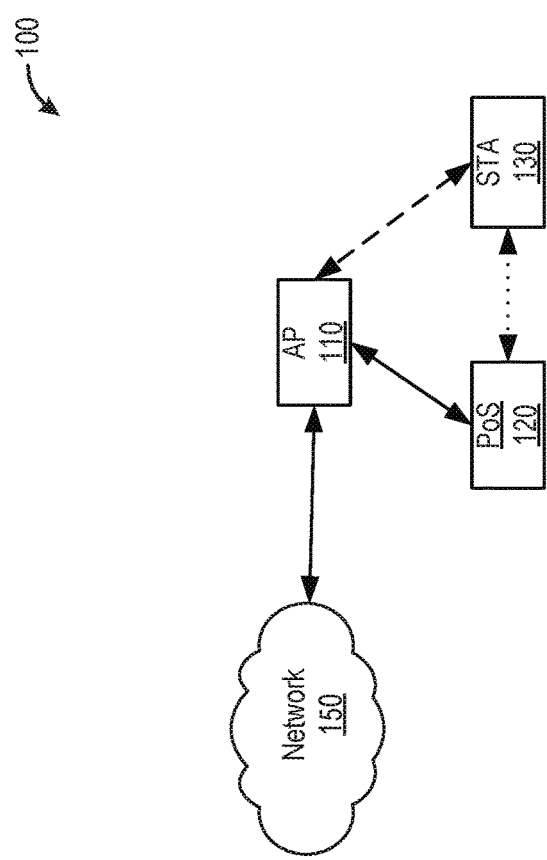
FIG. 1 illustrates an example network environment in accordance with one or more implementations.

FIG. 1 illustrates an example network environment 100 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 100 may be, and/or may include, a wireless network and/or a wired network. The network environment 100 includes an AP 110, a point-of-sales system (PoS) 120, a station (STA) 130, and a network 150. The AP 110 may be a wireless AP. The PoS 120 may be a point-of-sale machine, such as a register, a tablet, or other PoS device. The STA 130 may be a client device, such as wireless devices, e.g. Institute of Electrical and Electronics Engineers (IEEE) 802.11 devices. The network 150 may include one or more wired and/or wireless network devices, such as switches, routers, wireless APs, etc., that may facilitate communication between connected devices. One or more of the AP 110, PoS 120, and STA 130 may be and/or may include all or part of the electronic system discussed below with respect to FIG. 9.

The STA 130 can be a computing device such as a laptop or desktop computer, smartphone, user equipment, or electronic devices that can be used to transmit and/or receive data. The STA 130 may communicate with one or more of the AP 110 and the PoS 120, e.g. wirelessly, by utilizing one or more teachings discussed below with respect to in FIGS. 2-8. For example, the STA 130 may be authenticated by the AP 110 and permitted to connect to the network 150 according to one or more of the teachings described in FIGS. 2-8.

The network environment 100 may be a wireless local area network (WLAN) environment. The network environment 100 may utilize various WLAN topologies, including an infrastructure basic service set (BSS), independent BSS (IBSS), mesh, WiFi Direct, WiFiAware, among others. The network environment 100 may allow operation in WLAN operation bands such as 2.4 GHz, 5 GHz, 60 GHz, 900 MHz, television (TV) white space, among others.

In one or more implementations, the subject technology allows for server authentication and client authentication for a client device connecting to an AP. Many consumer-grade APs for WiFi, used for example by small businesses to provide their customers with WiFi network access, utilize open security or a semi-public passphrase, which may be written down in plain view (e.g., written on a menu, on a wall, etc.).

Although this arrangement may be more convenient to the small business owner and the customers, this arrangement presents security issues. Firstly, both open security and semi-public passphrase usage are susceptible to passive sniffing of packets by a malicious actor (e.g., WiFi eavesdropping). Open security has no link encryption, thereby allowing a malicious actor to passively sniff all packets. Even though a semi-public passphrase provides link encryption, it requires a common pairwise master key (PMK) such that, when the passphrase is publicly known, packets can be passively sniffed and decrypted (after the malicious actor has sniffed the handshake sequence). Secondly, there may be a man-in-the-middle (MITM) vulnerability, in which a malicious actor actively sets up a fraudulent AP having the same SSID and passphrase as the genuine AP. Users may inadvertently connect to the fraudulent AP and, thus, allowing the malicious actor to sniff, modify and inject packets, as well as have full layer-2 access to client devices. The malicious actor (or fraudulent AP) also may use this to exploit any known vulnerabilities in the client device.

These security issues remain despite increased customer usage of secure network technologies (e.g., HTTPS, VPN, etc.). For example, user-identifying metadata may be sent in open (or unencrypted). In other examples, users may not have good visibility of when higher-layer encryption is being used (e.g., in mobile applications), and may inadvertently undermine the encryption (e.g., a user trusting a rogue certificate). In some cases, there is potential for exploitation of client device vulnerabilities.

Highly secure WiFi solutions exist but are commonly used in enterprise settings, and may not be feasible in a small business environment. In addition, the small business proprietor may wish to limit user access to the WiFi hotspot, such as limiting to paying customers only. Some of these WiFi solutions assume that the user trusts the proprietor, and the network it has deployed. Therefore, to mitigate the MITM vulnerability, it may be sufficient that the client device validates the network being connected to is genuinely deployed by the proprietor (e.g., not a fraudulent AP deployed by a malicious actor). In this respect, some of these solutions implement one of two possible approaches: 1) a public key infrastructure (PKI)-based approach, or 2) a trust bootstrapping by the user approach.

In the PKI-based approach, trust in a third party is bootstrapped by pre-installation in a client device (e.g., root certificate). The user may then select a network or service provider by name (e.g., by Friendly Name) from a list, and the network proves it is deployed by a proprietor whose right to deploy a network with that name has been validated by the third party. For network deployment, the proprietor would need to apply to the trusted third party for a server certificate that is signed by the root certificate and install the server certificate in their access point, where the root certificate of the trusted third party is pre-installed in client devices that support the authentication mechanism. This may generally require proof of business ownership and/or proof of domain ownership, which is burdensome, technically complex and may be expensive to the proprietor (who is generally not a network professional) to perform. There may be potential attack vectors in the PKI-based approach, where a private key and signed certificate with an ambiguous network name (e.g., "Café X Wi-Fi") are obtained and shared by malicious actors that can be reused in fraudulent APs. The certificate would need to be revoked by the third party to thwart this type of attack.

In the trust bootstrapping approach, trust in the proprietor is directly bootstrapped in the client device by the user inputting keying material provided by the proprietor (e.g., scanning a quick response (QR) code or enter code printed on a menu, board or a receipt, which embeds keying material). The network proves it is deployed by the proprietor that provided the keying material. For network deployment, the proprietor may use the genuine AP's firmware (e.g., graphical user interface/application, and possibly point-of-sale equipment) to locally generate keying material that a user can input. There also may be potential attack vectors in the trust bootstrapping approach, where a malicious actor can physically replace keying material with its own (e.g., place stickers over QR codes on menus), or other social engineering schemes to cause users to trust its own keying material. However, the impact may be local, and generally simple for the proprietor to detect and revoke.

A ticket-based shared secret authentication process provides an enhanced secure provisioning method for hotspots by providing secure link encryption, server authentication to mitigate MITM vulnerabilities, and client authentication to allow user access control. The AP 110 is configured with a master encryption key (master secret) and a public encryption key. The master encryption key and public encryption key are installed in the PoS 120. The proprietor may manually install the master encryption key and the public encryption key, or may transfer the master encryption key and the public encryption key through a secure communication channel to the PoS 120.

Figure 2:
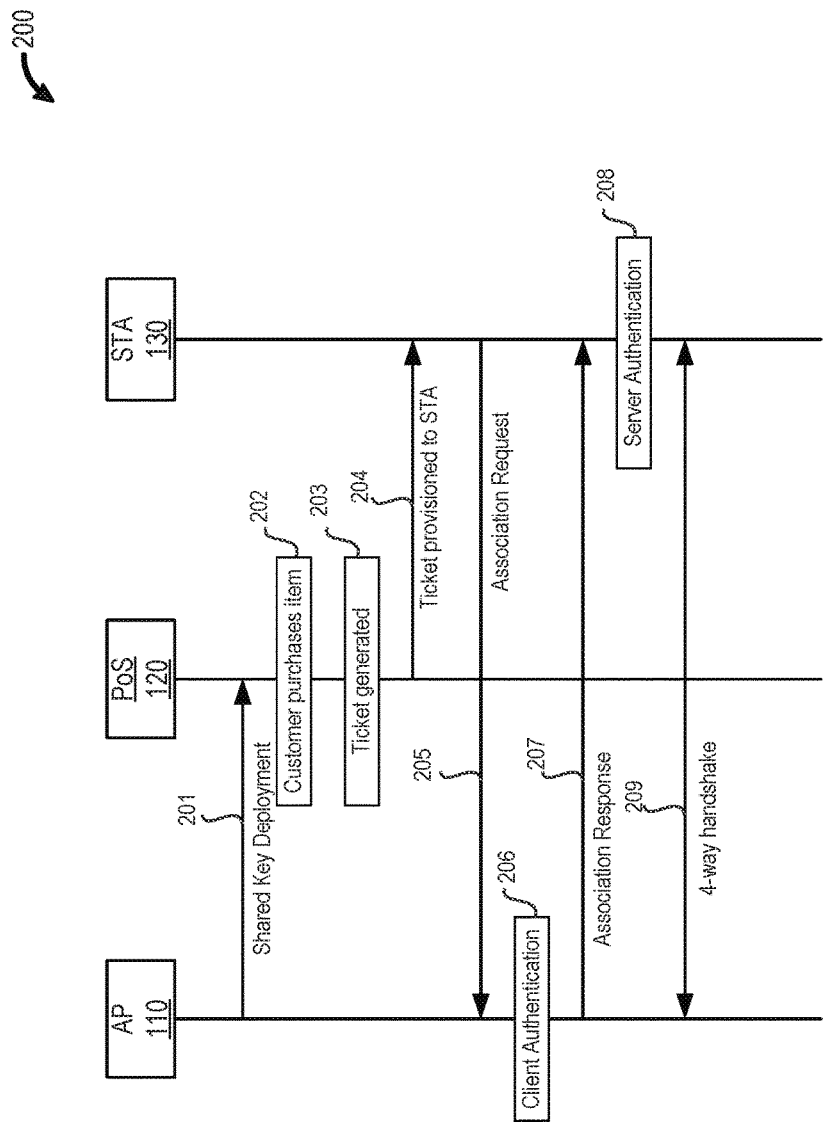
FIG. 2 illustrates an example of enhanced ticket-based shared secret authentication for secure provisioning in accordance with one or more implementations.

FIG. 2 illustrates an example of enhanced ticket-based shared secret authentication 200 for secure provisioning in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

In certain implementations, the PoS 120 generates a per-user nonce public key-private key pair. The AP 110 has an AP public key-private key pair generated a-priori, and the AP public key and a master secret is shared between the AP 110 and the PoS 120 (e.g., 201). In some implementations, there is no online (or real-time) access between the AP 110 and the PoS 120 during normal operation. In one or more aspects, the PoS 120 is a trusted third party intermediate device between the AP 110 and the STA 130.

When a customer with the STA 130 makes a purchase at the PoS 120 (e.g., 202), the PoS 120 produces a ticket for the customer (e.g., 203). The ticket includes a nonce private key, an encrypted nonce public key—which may be appended with an expiration time and encrypted with the master secret, an AP public key shared a-priori between the AP 110 and the PoS 120, and the expiration time—which may be unencrypted so that the STA 130 knows when the session expires. The expiration time may indicate a time at which the STA 130's access to the AP 110 will be revoked. In other aspects, the expiration time may indicate the time until that the AP 110 will allow a device to join the network 150 using the ticket (e.g., in this case there is no revocation). In some aspects, the ticket may include a replay counter. The replay counter prevents the same ticket from being used more than once. In some aspects, the nonce public key may be randomly generated per user. In some implementations, the public key-private key pair is randomly generated by the user.

In some implementations, the ticket may be a physical ticket, such as printed as part of a receipt, having the nonce, and encrypted nonce. The nonce and encrypted nonce may be presented as a two-dimensional barcode such as a QR code that the STA 130 can scan (e.g., 204). Alternatively, the QR code may be displayed on a screen of the PoS 120. In certain implementations, the ticket may be securely communicated to the STA 130, for example through a communication channel requiring physical proximity to the PoS 120.

The STA 130 receives the ticket, as described above, and begins an authentication process, such as Diffie-Hellman (DH) key exchange. The STA 130 hashes the nonce public key from the nonce private key, for example using an elliptic curve generator function or other generator function. The STA 130 generates a device ephemeral public key-private key pair, and a random challenge. The random challenge may be a device nonce. The STA 130 sends an uplink request such as an association request to the AP 110 (e.g., 205), which includes a concatenation of the encrypted nonce public key, the device ephemeral public key, the random challenge. The uplink request also includes a device signature over the concatenation of the encrypted nonce public key, the nonce public key, the device ephemeral public key, and the random challenge, which is signed with the nonce private key.

The AP 110 authenticates the STA 130 (e.g., 206). The AP 110 decrypts the nonce public key and expiration time from the encrypted nonce public key using the master secret, then uses this decrypted nonce public key to verify the device signature using standard techniques (e.g., an elliptic curve signature verification process). This verifies that the ticket came from a genuine PoS, such as the PoS 120, that knew the master secret.

The AP 110 generates an AP ephemeral public key-private key pair. The AP 110 sends a downlink response such as an association response to the STA 130 (e.g., 207). The downlink response includes the AP ephemeral public key and an AP signature. The AP signature is computed over the concatenation of the AP ephemeral public key and the random challenge using the AP private key.

The STA 130 authenticates the AP 110 (e.g., 208). The STA 130 verifies the AP signature using the AP public key, which was in the ticket. This verifies that the AP 110 possesses the AP private key.

In some implementations, the STA 130 begins the authentication process with the AP 110 using IEEE 802.11 authentication messages (e.g., Authentication Request, Authentication Response) in lieu of the exchange of association messages (e.g., Association Request, Association Response). For example, the STA 130 may send an uplink request such as an authentication request to the AP 110, and the AP 110 may then authenticate the STA 130 based on the authentication request. The AP 110 may send a downlink response such as an authentication response to the STA 130 to indicate that the AP 110 has verified the STA 130. In this respect, the association between the STA 130 and the AP 110 may be initiated in response to the authentication response from the AP 110. In other implementations, the authentication process may use other pre-association uplink and downlink messages such as action frames.

The STA 130 and the AP 110 may complete a four-way handshake, for example by each deriving a PMK from the respective ephemeral keys (e.g., 209). Once the authentication process completes, the STA 130 may associate with the AP 110 such that the AP 110 permits the STA 130 to access the network 150.

Figure 3:
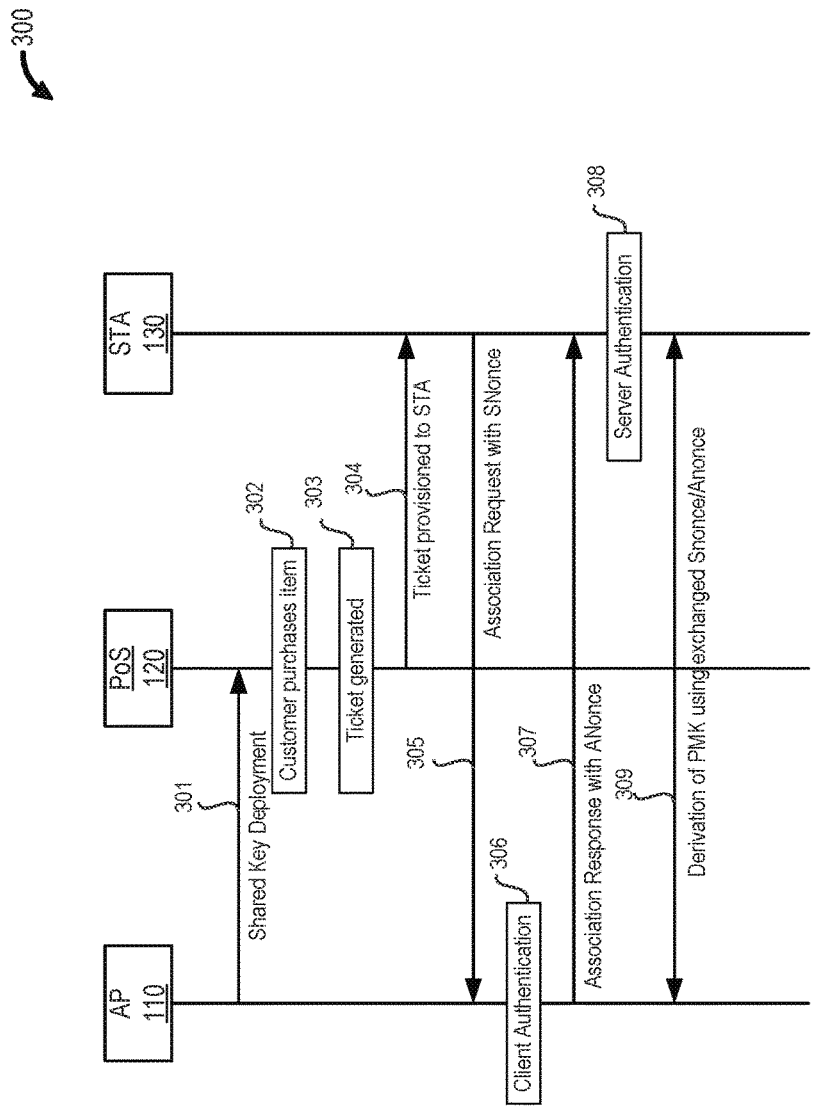
FIG. 3 illustrates another example of enhanced ticket-based shared secret authentication for secure provisioning in accordance with one or more implementations.

FIG. 3 illustrates another example of enhanced ticket-based shared secret authentication 300 for secure provisioning in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The STA 130 receives the ticket (e.g., 304), as described above, and begins an authentication process. The STA 130 hashes the nonce public key from the nonce private key, for example using an elliptic curve generator function or other generator function. The STA 130 generates a device ephemeral public key-private key pair, and a station random challenge (e.g., "SNonce"). The station random challenge may be a device nonce. The STA 130 sends an association request to the AP 110 (e.g., 305), which includes a concatenation of the encrypted nonce public key, the device ephemeral public key, the station random challenge. The association request also includes a device signature over the concatenation of the encrypted nonce public key, the nonce public key, the device ephemeral public key, and the station random challenge using the nonce private key.

The AP 110 authenticates the STA 130 (e.g., 306). The AP 110 decrypts the nonce public key and expiration time from the encrypted nonce public key using the master secret, then uses this decrypted nonce public key to verify the device signature using standard techniques (e.g., an elliptic curve signature verification process). This verifies that the ticket came from a genuine PoS, such as the PoS 120, that knew the master secret.

The AP 110 generates an AP ephemeral public key-private key pair, and an AP random challenge. The AP 110 sends an association response to the STA 130 (e.g., 307). The association response includes the AP ephemeral public key, the AP random challenge and an AP signature. The AP signature is over the concatenation of the AP ephemeral public key, the station random challenge, and the AP random challenge, which may be signed using the AP private key.

The STA 130 authenticates the AP 110 (e.g., 308). The STA 130 verifies the AP signature using the AP public key, which was in the ticket. This verifies that the AP 110 possesses the AP private key. The STA 130 and the AP 110 may each derive a PMK from the respective ephemeral keys, and derive respective pairwise transient key (PTK) temporal keys from the derived shared PMK using the exchanged station random challenge (e.g., SNonce) and the AP random challenge (e.g., ANonce), without the need to complete a four-way handshake, thereby the time to connect (or become associated) can be reduced (e.g., 309). In some aspects, groupwise transient keys (GTK), and other required keys, can be distributed from the AP 110 to the STA 130 encrypted by the PTK temporal keys. Once the authentication process completes, the STA 130 may associate with the AP 110 such that the AP 110 permits the STA 130 to access the network 150.

Figure 4:
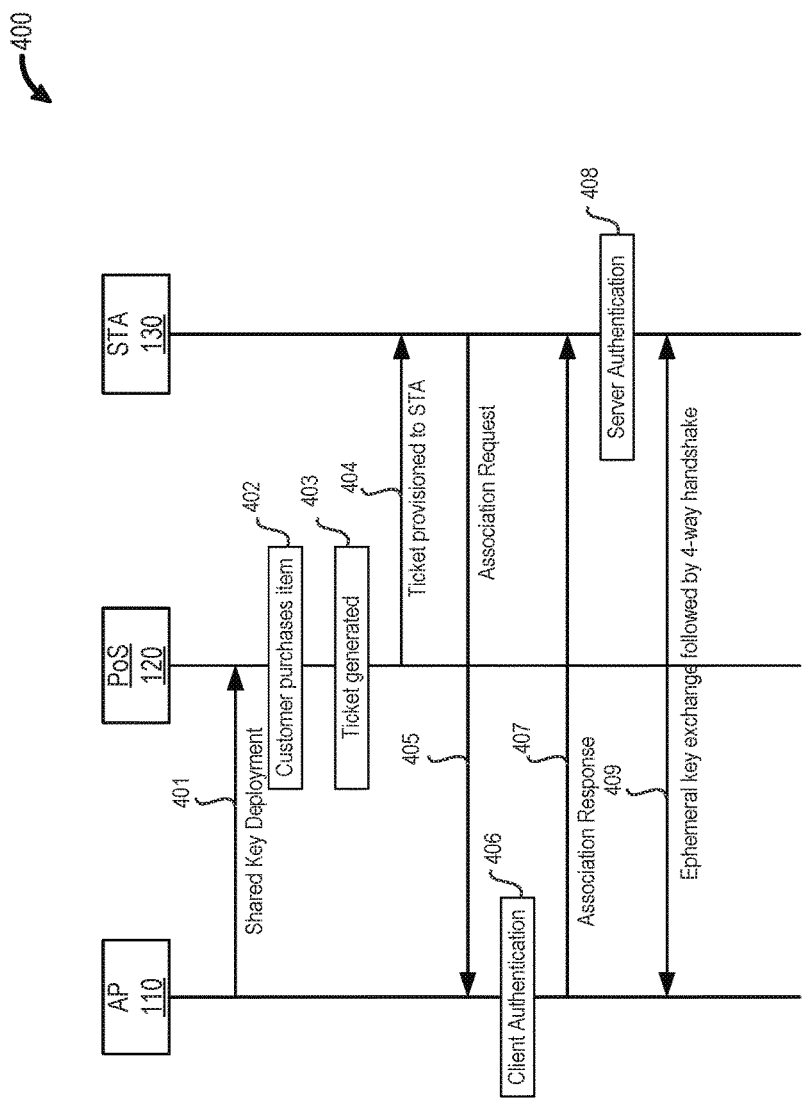
FIG. 4 illustrates another example of ticket-based shared secret authentication for secure provisioning in accordance with one or more implementations.

FIG. 4 illustrates another example of ticket-based shared secret authentication for secure provisioning in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The STA 130 receives the ticket (e.g., 404), as described above, and begins an authentication process. The ticket may include an expiration time and/or a replay counter (e.g., 403). The STA 130 generates an ephemeral public/private key pair. The STA 130 then generates a hash of the STA's public key using the nonce. The AP 110 also generates an ephemeral public/private key pair.

The STA 130 sends an association request including the STA public key, hashed STA key, and the encrypted nonce to the AP 110 (e.g., 405). The AP 110 authenticates the STA 130 by verifying that the encrypted nonce received from the STA 130 originated from a genuine PoS, such as the PoS 120 by regenerating the hashed STA key (e.g., 406). The AP 110 has the master key to decrypt the encrypted nonce, and uses the de-encrypted nonce to regenerate the hashed STA key. If the regenerated hashed STA key matches the received hashed STA key, the STA 130 is authenticated.

The AP 110 hashes the AP public key using the nonce and sends the hashed AP key and the AP public key to the STA 130 (e.g., 407). The STA 130 authenticates the AP 110 by verifying that the AP 110 possesses the master key (e.g., 408). The STA 130 regenerates the hashed AP key using the nonce it already has, and hashes the received AP public key. If the regenerated hashed AP key matches the received hashed AP key, the STA 130 is authenticated.

Once this authentication process completes, the STA 130 may associate with the AP 110 such that the AP 110 permits the STA 130 to access the network 150 (e.g., 409). The access may expire after a predetermined period of time, or when the expiration time is reached. The access may be denied if the replay counter indicates the corresponding ticket was already used.

FIGS. 5A and 5B illustrate examples of secure provisioning using anonymous authentication in accordance with one or more implementations. In FIGS. 5A and 5B, an approach to address the MITM vulnerability is based on an anonymous authentication (e.g., 500, 550) that is similar to a server-side authentication only but without the PKI. The AP 110 self-generates and installs a public/private key pair. The public key may be distributed in a QR code. The private key may be generated based on elliptic curve cryptography, where the private key is generated from a pseudo-random curve that provides about 128 bits of security. The parameters for the private key generation are arbitrary and may vary depending on implementation (e.g., key length, underlying field, basis, curve, etc.). The use of the QR codes (e.g., 502, 552) provide MITM mitigation via the server authentication by the station 130. The proprietor may control distribution of the QR code (e.g., only on menus) to deter casual piggy-backers.

In FIG. 5A, the AP 110 embeds a self-signed certificate 504 into a QR code 502. The QR code 502 may include a string of base64 for the entire DER-encoded certificate (e.g., X.509). In this respect, the QR code may be relatively complex and difficult to print and/or scan in a small business environment. In FIG. 5B, the AP 110 embeds a raw public key 554 into a QR code 552. The QR code 552 may include a string comprised of a base64 of the DER-encoded compressed public key (e.g., 554). The certificate payload may include a "SubjectPublicKeyInfo" data structure that contains the raw public key. The QR code 552 may be supported by a transport layer security (TLS) protocol designated for the use of raw public keys. In this respect, aside from the public key, no other information in the self-signed certificate may be needed. The use of this string in the QR code 552 may be provided as an extension to the TLS handshake protocol with the use of the "SubjectPublicKeyInfo" data structure in the certificate payload that contains the raw public key. In comparison to the QR code 502 of FIG. 5A, the QR code 552 has a simpler framework, and may be easier to print and/or scan in the small business environment.

In some implementations, the MITM vulnerability may be mitigated based on a provisioning protocol. The station 130 may initiate an authentication with the AP 110 when a user associated with the station 130 scans a QR code that encodes a public key of the AP 110. In this respect, the station 130 may receive the public key of the AP 110, and provisions the AP 110 with a signed ticket. Since each client device (e.g., station 130) connecting to a network (e.g., network 150) can be a separate initiator, each client device may generate a unique ticket. The AP 110 may store all of the tickets generated by the client devices connected to the network so that the AP 110 can repeat a peer discovery when a client flushes a local master key (e.g., PMK/PMKID). The station 130 may provision itself with a matching signed ticket. In this respect, the station 130 may provision itself, and may initiate peer discovery with the AP 110. Upon mutual validation, a unique pairwise PMK/PMKID may be derived and used in a 4-way handshake between the AP 110 and the station 130. In this example, MITM mitigation is provided because a fraudulent AP would not know the private key analog of the public key published by the proprietor (and scanned by the client device), thus provisioning of the fraudulent AP with the signed ticket would fail.

Figure 6:
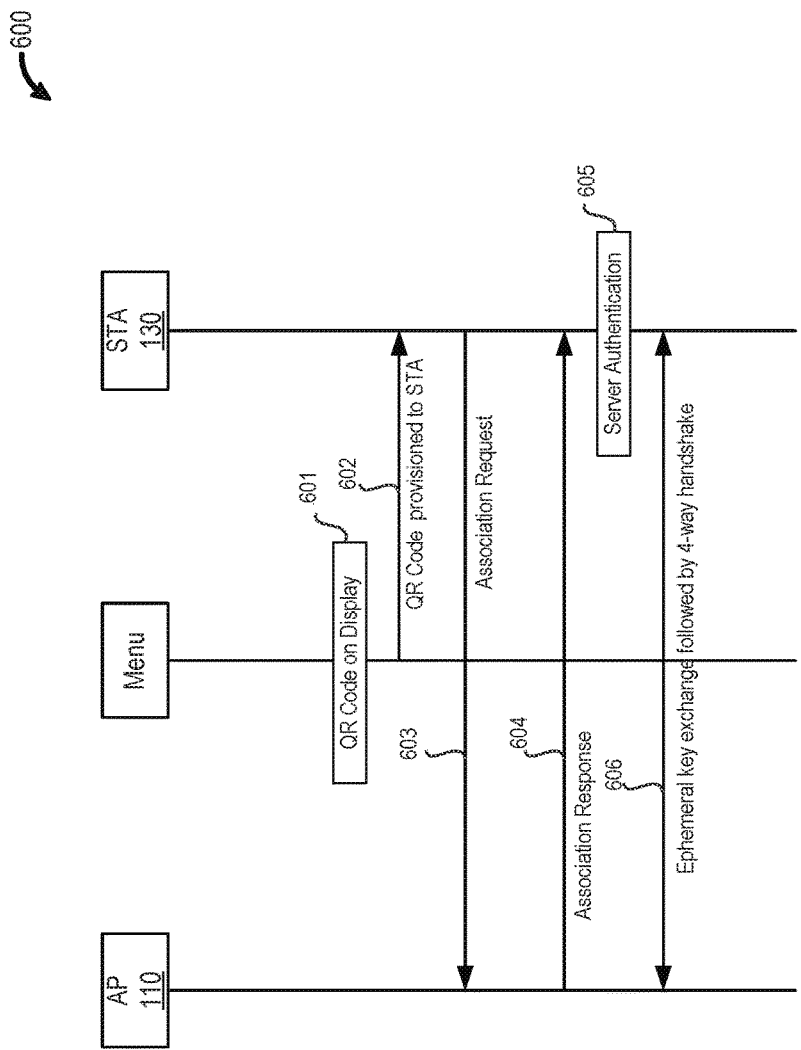
FIG. 6 illustrates an example of secure provisioning using AP public key in accordance with one or more implementations.

FIG. 6 illustrates an example of secure provisioning 600 using AP public key in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

A proprietor may provide a customer with WiFi network access by displaying a QR code or scannable code printed on a menu in plain view (e.g., 601). The QR code may include the AP public key. The STA 130 receives the QR code, as described above, and begins an authentication process (e.g. 602). The STA 130 generates a device ephemeral public key-private key pair, and a random challenge. The STA 130 sends an association request to the AP 110, which includes a concatenation of the device ephemeral public key and the random challenge (e.g., 603). The AP 110, however, does not perform any authentication of the STA 130.

The AP 110 generates an AP ephemeral public key-private key pair. The AP 110 sends an association response to the STA 130 (e.g., 604). The association response includes the AP ephemeral public key and an AP signature. The AP signature may be a concatenation of the AP ephemeral public key and the random challenge, which may be encrypted using the AP private key.

The STA 130 authenticates the AP 110 (e.g., 605). The STA 130 verifies the AP signature using the AP public key, which was in the QR code. This verifies that the AP 110 possesses the AP private key. The STA 130 and the AP 110 may complete a four-way handshake, for example by each deriving a PMK from the respective ephemeral keys (e.g., 606). Once the authentication process completes, the STA 130 may associate with the AP 110 such that the AP 110 permits the STA 130 to access the network 150. The AP authentication avoids the MITM vulnerability, so long as the fraudulent AP does not know the AP private key.

Figure 7:
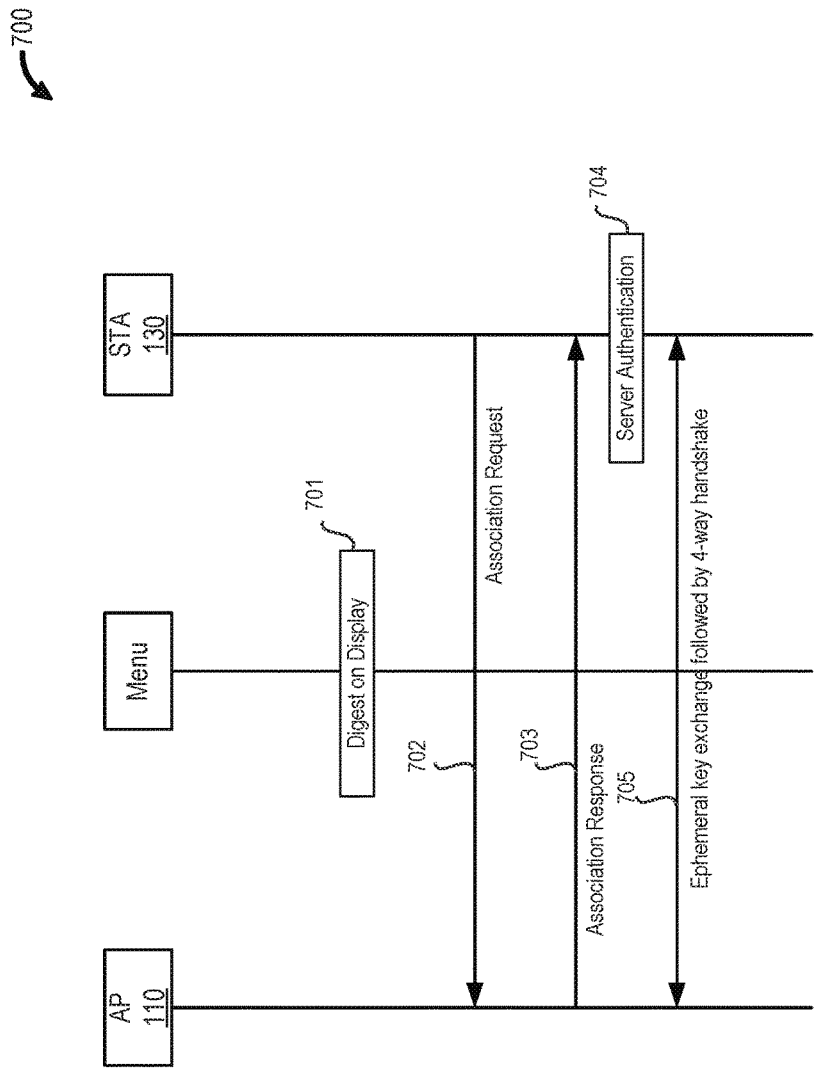
FIG. 7 illustrates an example of secure provisioning using digest of AP public key in accordance with one or more implementations.

FIG. 7 illustrates an example of secure provisioning 700 using digest of AP public key in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

A proprietor may provide a customer with WiFi network access by displaying a digest printed on a menu in plain view (e.g., 701). The digest may be represented as text, in graphical form, etc. The STA 130 receives an indication to begin an authentication process with the AP 110. The STA 130 generates a device ephemeral public key-private key pair, and a random challenge. The STA 130 sends an association request to the AP 110 (e.g., 702), which includes a concatenation of the device ephemeral public key and the random challenge. The AP 110, however, does not perform any authentication of the STA 130.

The AP 110 generates an AP ephemeral public key-private key pair. The AP 110 sends an association response to the STA 130 (e.g., 703). The association response includes the AP ephemeral public key, the AP public key and an AP signature. The AP signature may be a concatenation of the AP ephemeral public key, the AP public key and the random challenge, which may be encrypted using the AP private key.

The STA 130 authenticates the AP 110 (e.g., 704). The STA 130 generates a digest of the received AP public key, such that the user of the STA 130 can compare the digest provided for display on the STA 130 to that displayed by the proprietor. The STA 130 may prompt the user of the STA 130 to confirm that the locally generated digest matches the digest provided for display by the proprietor.

The STA 130 verifies the AP signature using the AP public key if the user confirms that the digests match. This verifies that the AP 110 possesses the AP private key. The STA 130 and the AP 110 may complete a four-way handshake, for example by each deriving a PMK from the respective ephemeral keys (e.g., 706). Once the authentication process completes, the STA 130 may associate with the AP 110 such that the AP 110 permits the STA 130 to access the network 150. The AP authentication avoids the MITM vulnerability, so long as the fraudulent AP does not know the AP private key.

Although the inventive concepts are discussed in a WiFi hotspot application, the secure provisioning provided by the ticket-based shared secret authentication may be used in other applications requiring secure provisioning of a resource by a resource manager to a client, which has access to a contact point. Other modifications to the authentication between the AP 110 and the station 130 may be implemented.

Figure 8:
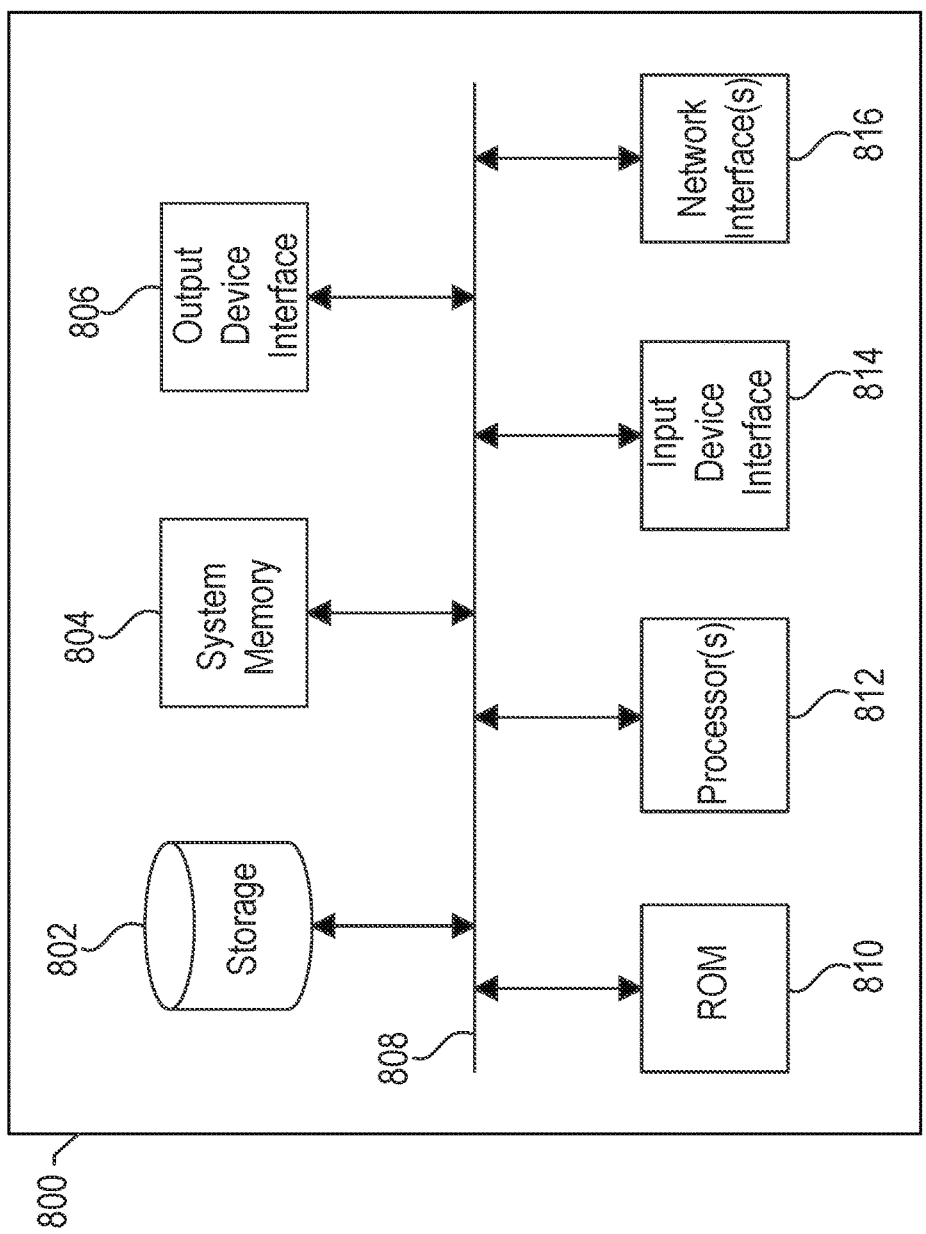
FIG. 8 conceptually illustrates an electronic system with which any implementations of the subject technology are implemented.

FIG. 8 conceptually illustrates an electronic system 800 with which one or more implementations of the subject technology may be implemented. The electronic system 800, for example, can be a network device, a media converter, a desktop computer, a laptop computer, a tablet computer, a server, a switch, a router, a base station, a receiver, a phone, or generally any electronic device that transmits signals over a network. Such an electronic system 800 includes various types of computer readable media and interfaces for various other types of computer readable media. In one or more implementations, the electronic system 800 may be, or may include, one or more of the devices 110, 120 and/or 130. The electronic system 800 includes a bus 808, one or more processing unit(s) 812, a system memory 804, a read-only memory (ROM) 810, a permanent storage device 802, an input device interface 814, an output device interface 806, and a network interface 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system. The permanent storage device 802, on the other hand, is a read-and-write memory device. The permanent storage device 802 is a non-volatile memory unit that stores instructions and data even when the electronic system 800 is off. One or more implementations of the subject disclosure use a mass-storage device (such as a magnetic or optical disk and its corresponding disk drive) as the permanent storage device 802.

Other implementations use a removable storage device (such as a floppy disk, flash drive, and its corresponding disk drive) as the permanent storage device 802. Like the permanent storage device 802, the system memory 804 is a read-and-write memory device. However, unlike the permanent storage device 802, the system memory 804 is a volatile read-and-write memory, such as random access memory. System memory 804 stores any of the instructions and data that the one or more processing unit(s) 812 needs at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input device interface 814 and the output device interface 806. The input device interface 814 enables a user to communicate information and select commands to the electronic system. Input devices used with the input device interface 814 include, for example, alphanumeric keyboards and pointing devices (also called "cursor control devices"). The output device interface 806 enables, for example, the display of images generated by the electronic system 800. Output devices used with the output device interface 806 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks (not shown) through one or more network interfaces 816. In this manner, the computer can be a part of one or more network of computers (such as a local area network ("LAN"), a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types)

encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   deploying, by an access point, a master secret to an intermediate device accessible to a client device;
   receiving, by the access point, an uplink request from the client device, the uplink request comprising an encrypted public key of a public key-private key pair generated by the intermediate device and provided to the client device, a random challenge and a device signature signed using a private key of the public key-private key pair, wherein the encrypted public key is encrypted using the master secret;
   decoding the encrypted public key using the master secret;
   authenticating the device signature using the decoded public key from the received uplink request;
   sending a downlink response to the client device based on the device signature being authenticated; and
   initiating, in response to the downlink response being sent, an association with the client device to permit the client device to connect to a network associated with the access point.

2. The method of claim 1, wherein the uplink request comprises a concatenation of the encrypted public key and a device ephemeral public key, wherein the public key is hashed from the private key of the public key-private key pair.

3. The method of claim 2, wherein the device signature comprises the concatenation signed using the private key.

4. The method of claim 3, further comprising:
   decoding an expiration time from the encrypted public key using the master secret.

5. The method of claim 4, wherein authenticating the client device comprises:
   verifying the device signature using the decoded public key, the verified device signature indicating that the intermediate device that provided a ticket to the client device is genuine.

6. The method of claim 1, further comprising:
   generating an access point ephemeral public key-private key pair.

7. The method of claim 6, wherein the association response comprises a concatenation of an ephemeral public key from the access point ephemeral public key-private key pair and an access point signature.

8. The method of claim 7, wherein the access point signature is computed over a concatenation of the ephemeral public key and a random challenge from the uplink request, the access point signature being encoded using the first private key.

9. The method of claim 6, further comprising:
   deriving a pairwise master key using one or more ephemeral keys of the access point ephemeral public key-private key pair; and
   performing a handshake with the client device using the derived pairwise master key.

10. The method of claim 1, wherein the uplink request comprises an association request and the downlink response comprises an association response.

11. The method of claim 1, wherein the uplink request comprises an authentication request and the downlink response comprises an authentication response.

12. An access point comprising:
    one or more processors; and
    a memory comprising instructions stored thereon that, when executed by the one or more processors, cause the one or more processors to perform operations, the operations comprising:
      generating a master secret and a first public key-private key pair, the first public key-private key pair comprising an access point private key;
      deploying the master secret to an intermediate device accessible to a client device;
      receiving an association request from the client device, the association request including an encrypted nonce public key, a random challenge associated with the client device and a device signature signed using a nonce private key associated with the client device, wherein the nonce public key and the nonce private key are a key pair generated by the intermediate device, and wherein the encrypted nonce public key is encrypted using the master secret and provided to the client device by the intermediate device;
      decrypting the encrypted nonce public key using the master secret;
      verifying the device signature using the decrypted nonce public key;
      generating an access point ephemeral public key-private key pair;
      generating an access point signature using the access point private key;
      providing an access point ephemeral public key of the access point ephemeral public key-private key pair and the encrypted access point signature to the client device; and
      initiating an association with the client device using one or more ephemeral keys exchanged with the client device.

13. The access point of claim 12, wherein the association request comprises a concatenation of the encrypted nonce public key, a device ephemeral public key and a random challenge, wherein the device signature comprises the concatenation signed using the nonce private key and wherein the operations further comprise:

decoding an expiration time from the encrypted nonce public key using the master secret.

14. The access point of claim 13, wherein authenticating the client device comprises:

verifying the device signature using the decoded nonce public key, the verified device signature indicating that the intermediate device that provided a ticket to the client device is genuine.

15. The access point of claim 12, wherein the operations further comprise:

generating an access point ephemeral public key-private key pair.

16. The access point of claim 15, wherein the operations further comprise:

deriving a pairwise master key using one or more ephemeral keys of the access point ephemeral public key-private key pair; and performing a handshake with the client device using the derived pairwise master key.

17. The access point of claim 12, wherein the access point signature is computed over a concatenation of the access point ephemeral public key and the random challenge associated with the client device.

18. The access point of claim 12, wherein the associating comprises:

permitting the client device to connect to a network associated with the access point.

19. A method comprising:

receiving, by a device, a ticket from an intermediate device, the ticket comprising a nonce private key, an encrypted nonce public key, an access point public key, and an expiration time associated with the ticket, wherein the nonce private key and the nonce public key are a key pair generated by the intermediate device, and wherein the encrypted nonce public key is encrypted using a master secret of an access point;

generating, by the device, a random challenge;

generating, by the device, a device signature using the nonce private key;

providing, by the device to the access point, the encrypted nonce public key, the random challenge and the encrypted device signature;

receiving an access point signature signed using an access point private key from the access point;

verifying the access point signature using the access point public key; and obtaining access to a network associated with the access point by an association with the access point.

20. The method of claim 19, wherein receiving the ticket comprises:

receiving a two-dimensional barcode readable by the device to provide the nonce private key, the encrypted nonce public key, and the access point public key to the device.

21. The method of claim 19, wherein the master key provided by the access point to the intermediate device.

* * * * *